United States Patent
Kim et al.

(10) Patent No.: US 10,819,164 B2
(45) Date of Patent: Oct. 27, 2020

(54) ADAPTIVE MODE SWITCHING METHOD FOR SIMULTANEOUS WIRELESS POWER/INFORMATION TRANSMISSION OPERATING IN DUAL MODE AND APPARATUS FOR PERFORMING THE SAME

(71) Applicant: Research & Business Foundation Sungkyunkwan University, Suwon-si (KR)

(72) Inventors: Dong In Kim, Seongnam-si (KR); Jong Jin Park, Suwon-si (KR); Jong Ho Moon, Busan (KR); Kang Yoon Lee, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/232,460

(22) Filed: Dec. 26, 2018

(65) Prior Publication Data
US 2020/0106308 A1    Apr. 2, 2020

(30) Foreign Application Priority Data

Oct. 1, 2018    (KR) .................. 10-2018-0117078

(51) Int. Cl.
*H02J 50/80*    (2016.01)
*H04L 7/00*    (2006.01)
(Continued)

(52) U.S. Cl.
CPC ............ *H02J 50/80* (2016.02); *H04L 1/0003* (2013.01); *H04L 1/0025* (2013.01);
(Continued)

(58) Field of Classification Search
CPC ...... H02J 50/80; H04L 1/0003; H04L 1/0025; H04L 5/1453; H04L 7/007; H04W 28/0221; H04W 52/24; H04W 52/262
See application file for complete search history.

(56) References Cited

U.S. PATENT DOCUMENTS 10,205,615 B2 *    2/2019    Gong .................. H02J 50/80

OTHER PUBLICATIONS

Park, Jong Jin et al., "Dual Mode SWIPT: Waveform Design and Transceiver Architecture with.Adaptive Mode Switching Policy", *2018 IEEE 87th Vehicular Technology Conference (VTC Spring)*, 2018 (5 pages in English).

(Continued)

*Primary Examiner* — Carlos Amaya
(74) *Attorney, Agent, or Firm* — NSIP Law

(57) ABSTRACT

The present disclosure relates to an adaptive mode switching method for simultaneous wireless power/information transmission operating in a dual mode and an apparatus for performing the same. The adaptive mode switching apparatus for simultaneous wireless power/information transmission operating in a dual mode includes: an energy harvesting unit; a single tone information receiving unit; a multi-tone information receiving unit; a time-division switch; and an adaptive mode switching control unit which determines a communication mode and a modulation index based on a battery status, the magnitude of the received signal, and a data transmission rate and controls the time-division switch in accordance with the selected communication mode and modulation index. It is possible to overcome a limited energy transmission area of simultaneous wireless power/information transmission (SWIPT) using a single tone in a low power IoT environment and a low transmission rate of a peak-to-average power ratio (PAPR)-based SWIPT using a multi-tone.

15 Claims, 10 Drawing Sheets

(51) Int. Cl.
*H04L 1/00* (2006.01)
*H04W 28/02* (2009.01)
*H04W 52/24* (2009.01)
*H04W 52/26* (2009.01)
*H04L 5/14* (2006.01)

(52) U.S. Cl.
CPC ............ *H04L 5/1453* (2013.01); *H04L 7/007* (2013.01); *H04W 28/0221* (2013.01); *H04W 52/24* (2013.01); *H04W 52/262* (2013.01)

(56) References Cited

OTHER PUBLICATIONS

Korean Office Action dated Jan. 20, 2020 in counterpart Korean Patent Application No. 10-2018-0117078 (5 pages in Korean).

\* cited by examiner

[FIG. 1]
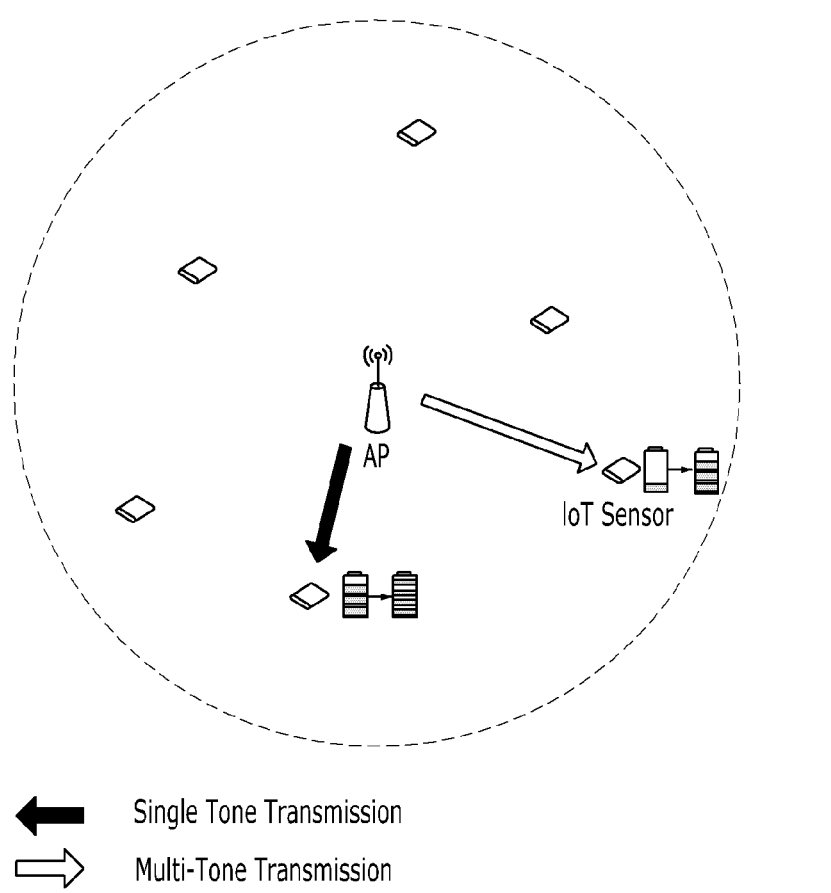

[FIG. 2A]
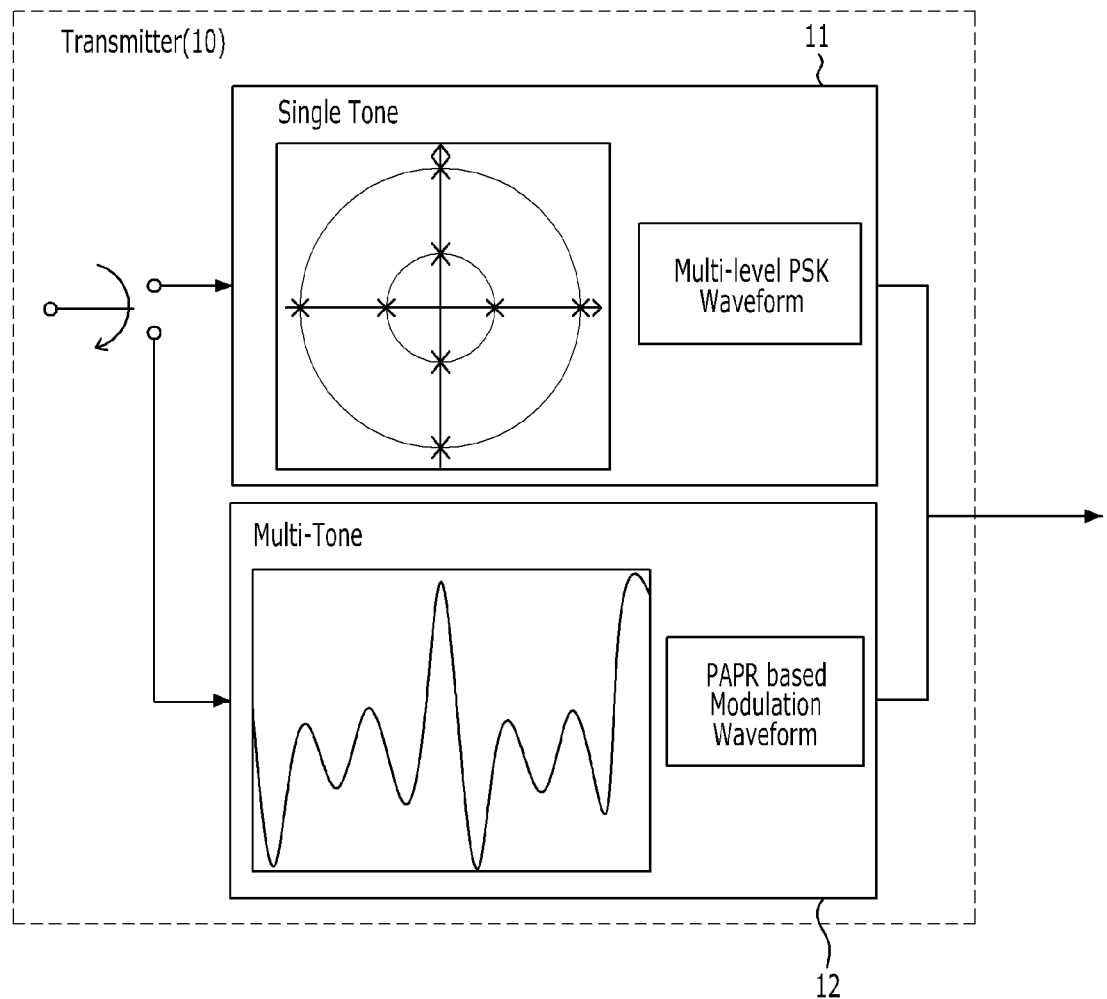

[FIG. 2B]
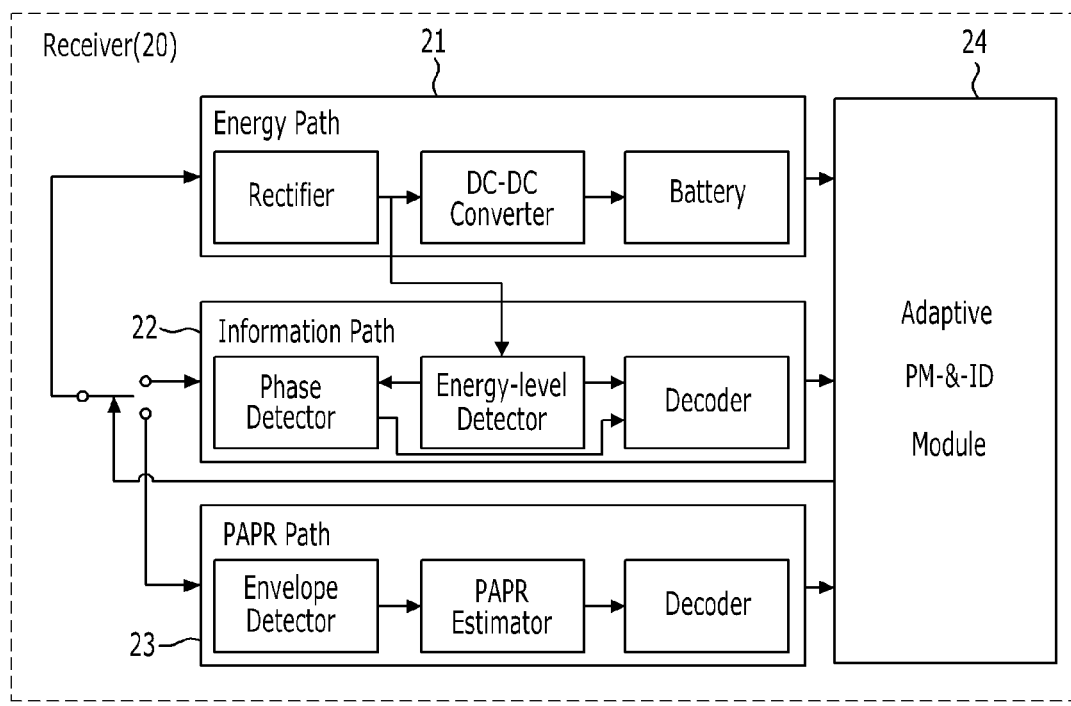

[FIG. 3]
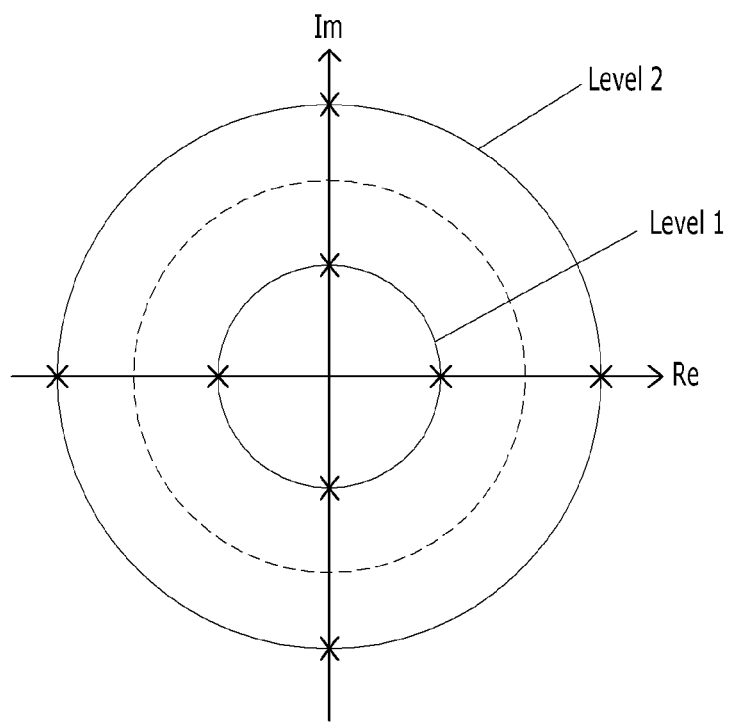

[FIG. 4]
| Pin(dBm) | Power Gain (dB) | |
|---|---|---|
| | 2-tone | 4-tone |
| 30 | -0.85 | -1.93 |
| 20 | -0.66 | -1.62 |
| 10 | -0.22 | -0.68 |
| 0 | 0.2 | -0.16 |
| -10 | 0.34 | 0.28 |
| -20 | 0.46 | 0.78 |
| -30 | 0.38 | 0.32 |
(a)
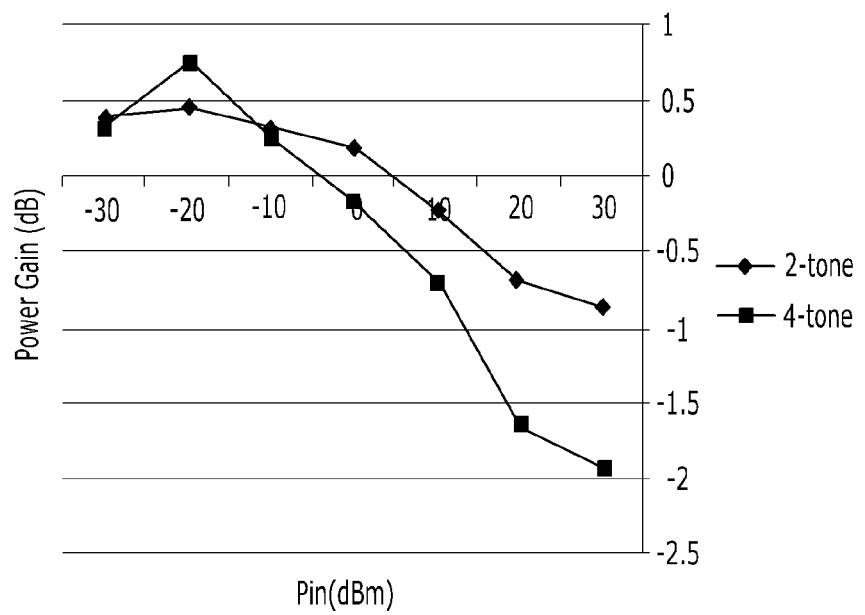
(b)

[FIG. 5]
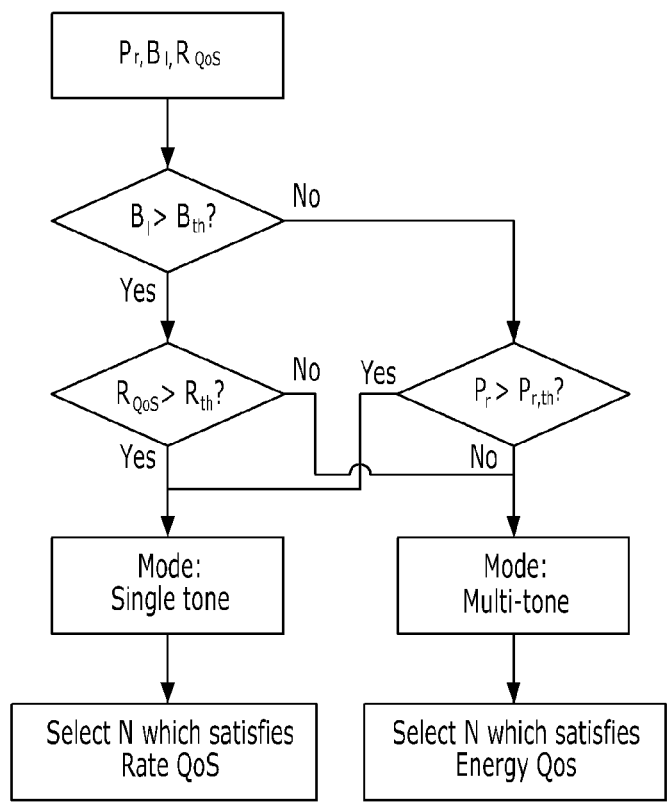

[FIG. 6]
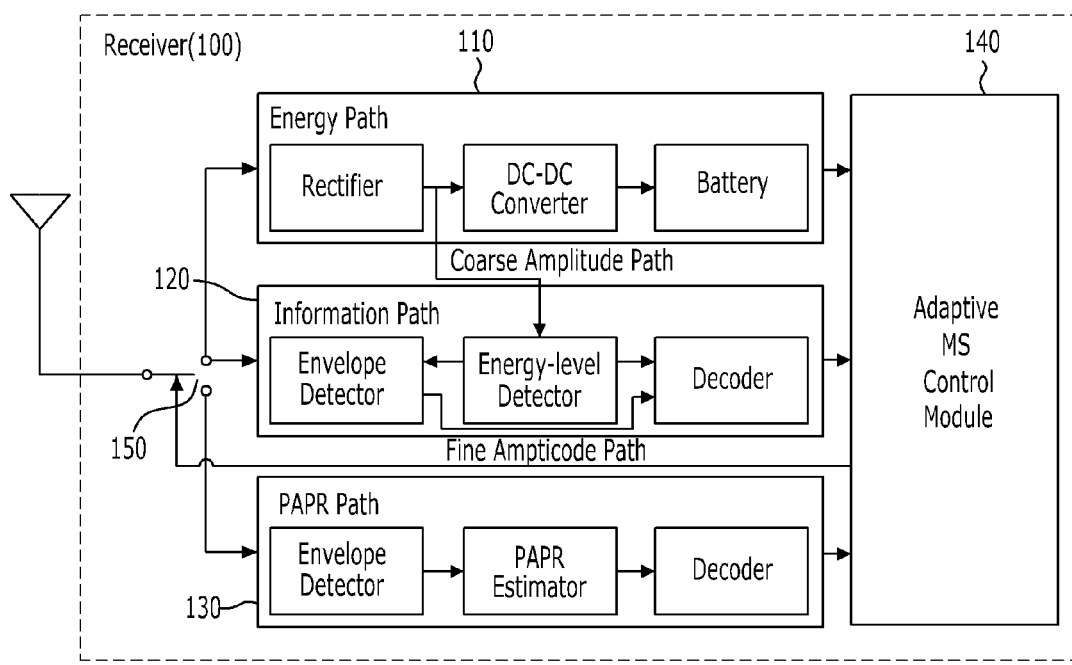
[FIG. 7]
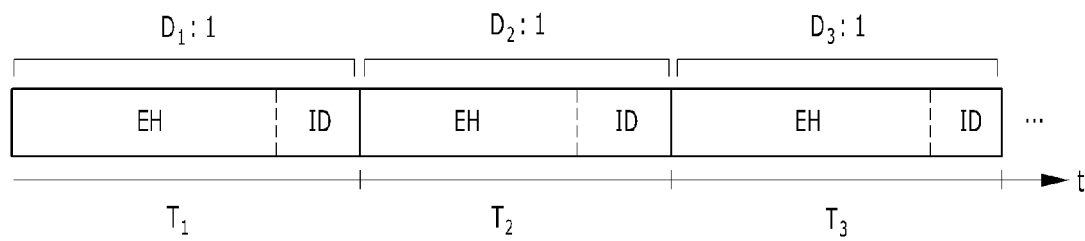

[FIG. 8]
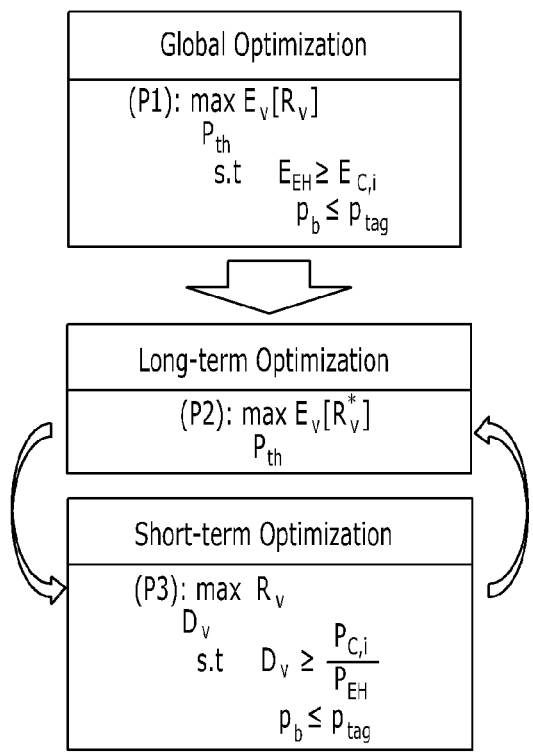
[FIG. 9]
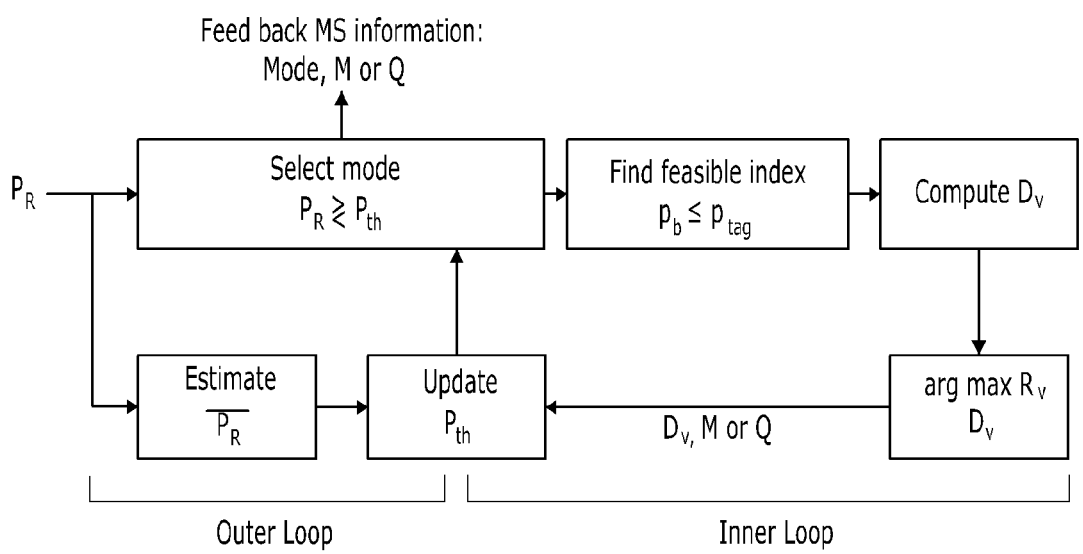

[FIG. 10]
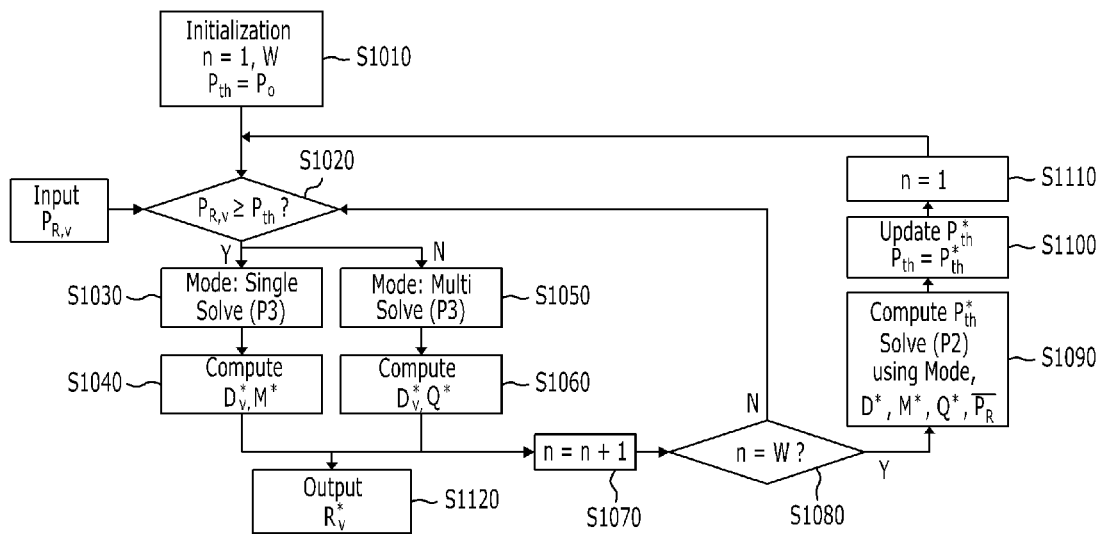
[FIG. 11]
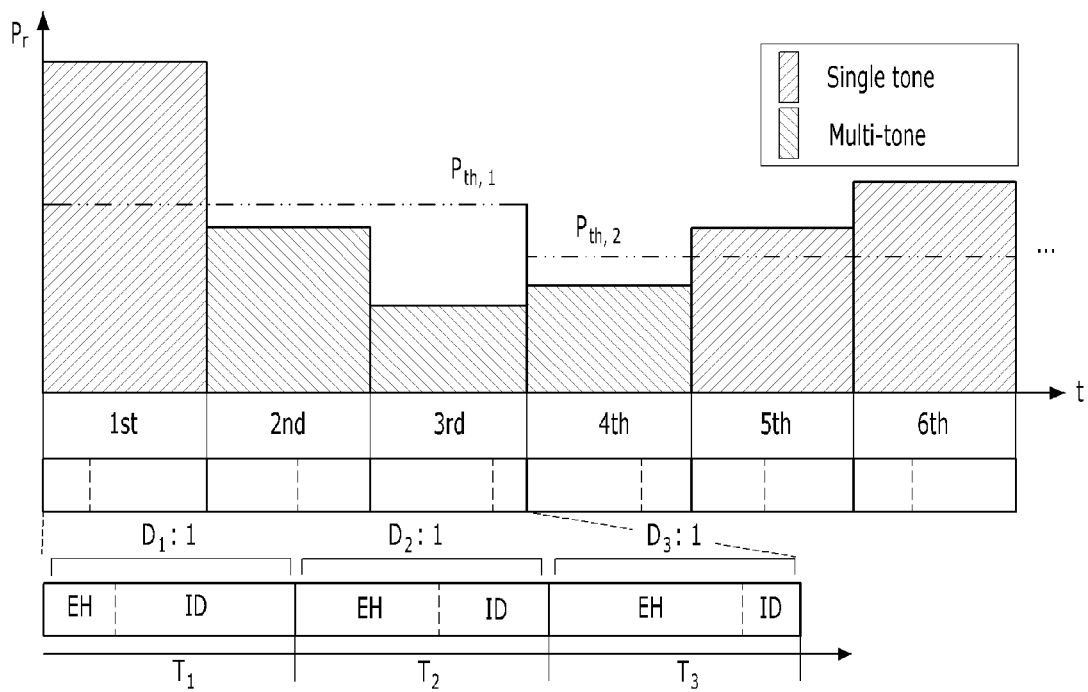

[FIG. 12]
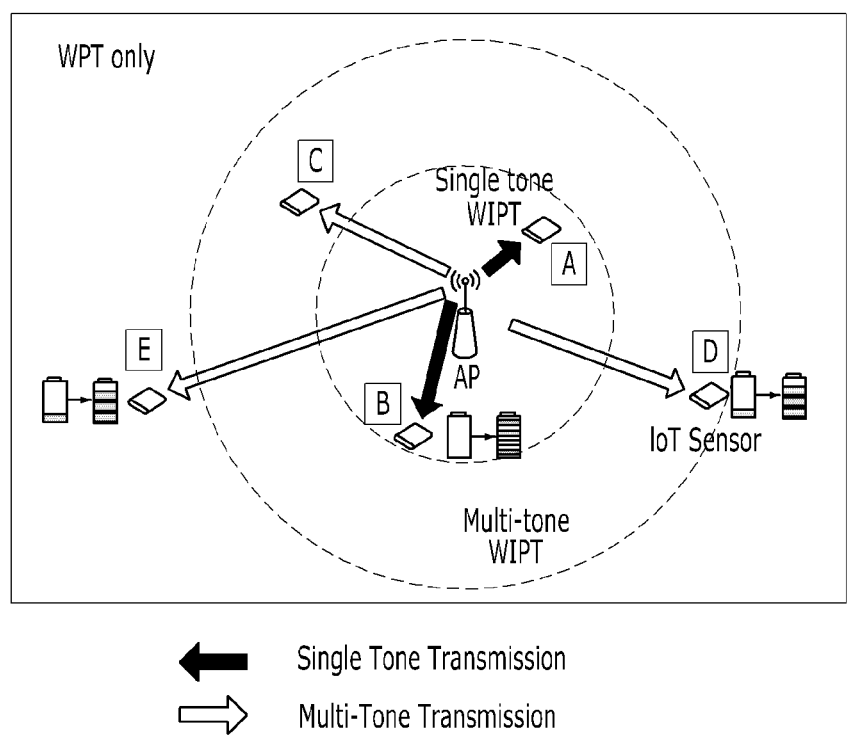

ADAPTIVE MODE SWITCHING METHOD FOR SIMULTANEOUS WIRELESS POWER/INFORMATION TRANSMISSION OPERATING IN DUAL MODE AND APPARATUS FOR PERFORMING THE SAME

CROSS-REFERENCE TO RELATED APPLICATIONS

This application claims the priority of Korean Patent Application No. 10-2018-0117078 filed on Oct. 1, 2018, in the Korean Intellectual Property Office, the disclosure of which is incorporated herein by reference.

BACKGROUND

Field

The present disclosure relates to an adaptive mode switching method for simultaneous wireless power/information transmission operating in a dual mode which is a single tone mode or a multi-tone mode and an apparatus for performing the same.

Description of the Related Art

Recently, studies on a wireless power supply and information transmission technology have been widely performed. The wireless power supply and information transmission technology is effective in supplying power to a device which has a low power consumption, such as Internet of things (IoT), a wearable device, or a biosensor. The simultaneous wireless information and power transmission which is a technology of simultaneously wirelessly transmitting information and energy of the related art is classified into a time switching (TS) manner which divides the time to sequentially receive the energy and information and a power splitting (PS) manner which splits a power of a received signal to provide a part of the signal to a circuit which harvests an energy and to provide the other part of the signal to a circuit which receives information.

When the simultaneous wireless power/information transmission of the related art which operates in a dual mode is used, a system performance of a receiving node, such as an energy harvesting efficiency or a data transmission rate, may vary depending on a battery status, a power of a received signal, and a transmission rate QoS. That is, in order to achieve the optimal performance, a system design considering the energy harvesting efficiency for self-powering and a data transmission rate which satisfies the QoS is necessary. Since the dual mode simultaneous wireless power/information transmission of the existing power-splitting manner uses a mode switching threshold value to increase the energy harvesting efficiency in a receiver, there is a problem in that the optimum data transmission rate cannot be guaranteed. Further, there is another problem in that since a duty-cycling operation required for self-powering of the low power device is not considered, it is difficult to implement an actual circuit. In order to efficiently operate the low power device, a method which simultaneously optimizes a tradeoff between the transmission rate and the energy efficiency and the duty-cycling operation is necessary.

SUMMARY

The present disclosure has been made in an effort to provide an adaptive mode switching method for simultaneous wireless power/information transmission operating in a dual mode which selectively switches a mode depending on a reception environment to adjust a communication mode and a modulation method and simultaneously optimize the transmission rate and the energy efficiency and an apparatus for performing the same.

According to an aspect of the present disclosure, an adaptive mode switching apparatus for simultaneous wireless power/information transmission operating in a dual mode includes: an energy harvesting unit which harvests an energy from a received signal which simultaneously transmits wireless power and information operating in a dual mode; a single tone information receiving unit which detects amplitude information and energy information of the received signal to decode the received signal when a magnitude of the received signal is larger than a threshold value; a multi-tone information receiving unit which estimates a peak-to-average power ratio (PAPR) of the received signal to decode the received signal when the magnitude of the received signal is smaller than the threshold value; a time-division switch which switches the received signal to one of the energy harvesting unit, the single tone information receiving unit, and the multi-tone information receiving unit; and an adaptive mode switching control unit which determines a communication mode and a modulation index based on a battery status, the magnitude of the received signal, and a data transmission rate and controls the time-division switch in accordance with the selected communication mode and modulation index.

The adaptive mode switching control unit may apply the first and second loop algorithms to determine a threshold value, a duty ratio which changes the respective periods of energy harvesting and information decoding, or a modulation index M or Q depending on single tone or multi-tone.

The adaptive mode switching control unit may control the time-division switch in accordance with the duty ratio and the modulation index to select one of the energy harvesting unit, the single tone information receiving unit, and the multi-tone information receiving unit.

The adaptive mode switching control unit may update the threshold value by the following Problem P1.

$$(P1): \max_{P_{th}} E_v[R_v]$$
$$\text{s.t. } E_{EH} \geq E_{C,i}$$
$$p_b \leq p_{tag}$$

(Here, $E_v[R_v]$ denotes an average transmission rate, $P_{th}$ denotes a threshold value for switching a communication mode, $E_{EH}$ denotes a harvested energy in the v-th time block, $E_{C,i}$ denotes an energy consumption of circuit, $P_b$ denotes a BER (Bit Error Rate) given the modulation index, and $P_{tag}$ denotes a target BER.)

The adaptive mode switching control unit may determine the threshold value by optimizing a duty ratio using Problem P3, so as to optimize a transmission rate, and then optimizing the threshold value based on the optimized transmission rate using Problem P2.

$$(P2): \operatorname*{argmax}_{P_{th}} E_v[R_v^*]$$

$$(P3): \operatorname*{argmax}_{D_v} R_v$$
$$\text{s.t. } D_v \geq \frac{P_{C,i}}{P_{EH}}$$
$$p_b \leq p_{tag}$$

(Here, $E_v[R_v^*]$ denotes an optimized average transmission rate, $D_v$ denotes a duty ratio, $R_v$ denotes a data transmission rate, $P_{C,i}$ denotes a power consumption of circuit, and $P_{EH}$ denotes a harvested power.)

The adaptive mode switching control unit may repeatedly optimize a duty ratio and a modulation index for a next received signal for every time block, using the optimized threshold value.

When optimization of the duty ratio and the modulation index is completed for a time block corresponding to a predetermined window size, the adaptive mode switching control unit may update the threshold value again.

When the adaptive mode switching control unit is used at a receiver, the adaptive mode switching control unit may transmit a mode switching feedback signal for a dual mode operation to a transmitter.

When a single tone mode is selected, the transmitter may transmit a transmission signal represented by the following Equation and the receiver may simultaneously decode the signal through a coarse amplitude path and a fine amplitude path.

$$s_s(t) = Re\{A \exp(j2f_c t + j\theta)\}$$

(Here, A denotes an amplitude of a modulated signal, $\theta$ denotes a phase of the modulated signal and $f_c$ is a single tone frequency of the signal.)

Further, when a multi-tone mode is selected, the transmitter selects N tones from Q selectable tones as represented in the following Equation to transmit the transmission signal.

$$s_m(t) = Re\left\{\sum_{n=1}^{N} \sqrt{\frac{2P_T}{N}} \exp(j2f_n t + j\phi)\right\}$$

(Here, $f_n$ denotes a frequency of each tone and $\phi$ denotes an initial phase aligned for maximum transmission PAPR.)

According to another aspect of the present disclosure, a system for simultaneous wireless power/information transmission operating in a dual mode includes: an adaptive mode switching receiver for simultaneous wireless power/information transmission operating in a dual mode which includes: an energy harvesting unit which harvests an energy from a received signal which simultaneously transmits wireless power and information operating in a dual mode; a single tone information receiving unit which detects amplitude information and energy information of the received signal to decode the received signal when a magnitude of the received signal is larger than a threshold value; a multi-tone information receiving unit which estimates a peak-to-average power ratio (PAPR) of the received signal to decode the received signal when the magnitude of the received signal is smaller than the threshold value; a time-division switch which switches the received signal to one of the energy harvesting unit, the single tone information receiving unit, and the multi-tone information receiving unit; and an adaptive mode switching control unit which determines a communication mode and a modulation index based on a battery state, the magnitude of the received signal, and a data transmission rate, and which controls the time-division switch in accordance with the selected communication mode and modulation index; and a transmitter which receives a mode switching feedback signal for a dual mode operation from the adaptive mode switching receiver to generate a transmission signal.

According to still another aspect of the present disclosure, an adaptive mode switching method for simultaneous wireless power/information transmission operating in a dual mode includes: a first step of setting initial values for a window size, a threshold value which switches a communication mode, a duty ratio of each communication mode, and a modulation index; a second step of determining whether a magnitude of a received signal is larger than the threshold value for every window size; a third step of determining a single tone mode as a communication mode when the magnitude of the received signal is larger than the threshold value and determining a multi-tone mode as a communication mode when the magnitude of the received signal is smaller than the threshold value; a fourth step of optimizing a duty ratio and a modulation index of the selected communication mode for every time block when the communication mode is determined; and a fifth step of increasing the number of time blocks, repeatedly performing the third step and the fourth step, and optimizing and updating the threshold value using the optimized communication mode, the duty ratio, the modulation index, and a magnitude of an average received signal when the number of time blocks is equal to the window size.

Here, after undating the threshold value, the first to fifth steps may be repeatedly performed.

In the fourth step, the duty ratio and the modulation index may be optimized using a data transmission rate optimized by the following Problem P3.

$$(P3): \operatorname*{argmax}_{D_v} R_v$$

$$\text{s.t. } D_v \geq \frac{P_{C,i}}{P_{EH}}$$

$$p_b \leq p_{tag}$$

(Here, $D_v$ denotes a duty ratio, $R_v$ denotes a data transmission rate, $P_{C,i}$ denotes a power consumption of circuit, and $P_{EH}$ denotes a harvested power.)

In the fifth step, the threshold value may be update to have an optimized average transmission rate by the following Problem P2.

$$(P3): \operatorname*{argmax}_{P_{th}} E_v[R_v^*]$$

(Here, $E_v[R_v^*]$ is an optimized average transmission rate.)

According to the present disclosure, it is possible to overcome a limited energy transmission range of simultaneous wireless power/information transmission (SWIPT) using a single tone in a low power IoT environment and a low transmission rate of a peak-to-average power ratio (PAPR)-based simultaneous wireless power/information transmission (SWIPT) using a multi-tone.

Further, according to the present disclosure, the energy harvesting and data transmission rate may be maintained by consistently updating an optimal mode switching threshold value according to the reception environment while operating transmitter/receiver in a dual mode by the adaptive mode switching method.

Furthermore, according to the present disclosure, the receiver is always supplied with a power at a predetermined ratio from an input signal by calculating a duty cycle for satisfying a self-powering condition to allow a self-powering operation of the receiver.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a view illustrating an environment where a plurality of IoT sensor nodes is provided in a service area of a transmitter which enables dual mode simultaneous wireless power/information transmission;

FIG. 2A is a schematic diagram of a transmitter included in FIG. 1;

FIG. 2B is a schematic diagram of a receiver included in FIG. 1;

FIG. 3 is a table of constellations of a single tone communication mode of a dual mode simultaneous wireless power/information transmission method;

FIG. 4 is a view for comparing a multi-tone energy conversion efficiency with respect to a single tone in accordance with received power, in the dual mode simultaneous wireless power/information transmission method;

FIG. 5 is a view for explaining an adaptive power management and information decoding policy of a dual mode simultaneous wireless power/information transmission method;

FIG. 6 is a schematic diagram of an adaptive mode switching apparatus for simultaneous wireless power/information transmission operating in a dual mode according to an exemplary embodiment of the present disclosure;

FIG. 7 is a view for explaining a time division operation used for an adaptive mode switching apparatus for simultaneous wireless power/information transmission operating in a dual mode according to an exemplary embodiment of the present disclosure;

FIG. 8 is a view for explaining an optimization cycle of a duty cycle/modulation index and an optimization cycle of a threshold value for simultaneous wireless power/information transmission operating in a dual mode according to an exemplary embodiment of the present disclosure;

FIG. 9 is a view for explaining a relationship with iterative first loop and second loop of an algorithm used for an adaptive mode switching apparatus for simultaneous wireless power/information transmission operating in a dual mode according to an exemplary embodiment of the present disclosure;

FIG. 10 is a flowchart for explaining an adaptive mode switching method for simultaneous wireless power/information transmission operating in a dual mode according to an exemplary embodiment of the present disclosure;

FIG. 11 is a view for explaining a mixed time scale operation used for an adaptive mode switching apparatus for simultaneous wireless power/information transmission operating in a dual mode according to an exemplary embodiment of the present disclosure; and FIG. 12 is a view illustrating an adaptive mode switching system example for simultaneous wireless power/information transmission operating in a dual mode according to an exemplary embodiment of the present disclosure.

DETAILED DESCRIPTION OF THE PREFERRED EMBODIMENT

Those skilled in the art may make various modifications to the present disclosure and the present disclosure may have various embodiments thereof, and thus specific embodiments will be described in detail with reference to the drawings. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present disclosure. A singular form may include a plural form if there is no clearly opposite meaning in the context. In the present application, it should be understood that term "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

Hereinafter, a normal dual mode simultaneous wireless power/information transmission method and an exemplary embodiment of an adaptive mode switching method for simultaneous wireless power/information transmission operating in a dual mode according to the present disclosure will be described in detail.

FIGS. 1 to 5 are views for explaining a general dual mode simultaneous wireless power/information transmitting method.

FIG. 1 is a view illustrating an environment where a plurality of IoT sensor nodes is provided in a service area of a transmitter which enables dual mode simultaneous wireless power/information transmission; FIG. 2A is a schematic diagram of a transmitter included in FIG. 1, and FIG. 2B is a schematic diagram of a receiver included in FIG. 1.

Referring to FIG. 1, a service area includes a transmitter 10 which is capable of switching modes in a dual mode and a plurality of IoT sensor nodes (that is, receivers 20) which are capable of receiving a signal from the transmitter 10.

The transmitter 10 selects a communication mode in accordance with a reception environment of the receiver 20 to transmit a signal which is generated in a single tone or transmit a signal which is generated in a multi-tone. When the signal is transmitted using a single tone at high received power, the energy transfer efficiency is low but the transmission rate is high and when the signal is transmitted using a multi-tone at low received power, the energy transfer efficiency is high but the transmission rate is low. However, since the transmitter 10 selectively switches the single tone or the multi-tone only based on a fixed threshold value, there is a limitation that the transmitter 10 cannot operate adaptively to the environment. Referring to FIG. 2A, a transmitter 10 which is capable of switching a simultaneous wireless power/information transmission mode using a single tone and a peak-to-average power ratio (PAPR)-based simultaneous wireless power/information transmission mode using a multi-tone is configured to include a single tone signal generating unit 11 and a multi-tone signal generating unit 12.

When the single tone signal generating unit 11 is selected in accordance with a control signal, a signal is transmitted after multi-level phase-shift keying (PSK) modulation and when the multi-tone signal generating unit 12 is selected, a signal is transmitted after PAPR-based modulation.

Referring to FIG. 2B, a receiver 20 which is capable of switching a simultaneous wireless power/information transmission mode using a single tone and a peak-to-average power ratio (PAPR)-based simultaneous wireless power/information transmission mode using a multi-tone is configured to include an energy harvesting unit 21, a single tone information receiving unit 22, a multi-tone information receiving unit 23, and an adaptive power management and information decoding (PM&ID) unit 24.

A circulator of the receiver 20 is controlled in accordance with a control signal of the adaptive PM&ID unit 24 to transmit the received signal to one of the energy harvesting unit 21, the single tone information receiving unit 22, and the multi-tone information receiving unit 23.

The energy harvesting unit 21 of the receiver harvests the energy from a signal which is received at all times regardless of the communication mode and the received signal charges the battery through DC-DC conversion via a rectifier. Specifically, when the single tone communication mode and the multi-level PSK modulation method are used, the DC signal which passes through the rectifier may be used to determine an energy level in the single tone information receiving unit 22.

The single tone information receiving unit 22 obtains phase information of a signal using a phase detector and then a DC signal sent from the rectifier is decoded together with the energy information obtained through an energy level detector. With this structure of the receiver, as compared with a single tone in-phase/quadrature modulation (I/Q) method of the related art, a high transmission rate may be obtained with low power consumption.

The multi-tone information receiving unit 23 is used in a multi-tone communication mode and when the PAPR modulation method is used, information is mapped to each PAPR value. An envelope detector detects an envelope from the received signal and the PAPR estimator calculates a PAPR of the signal using the envelope. The mapped information may be obtained therefrom. The multi-tone information receiving unit 23 consumes a less energy than the single tone information receiving unit 22 which needs to obtain phase information and energy information. Further, the multi-tone information receiving unit 23 uses multi-tone, so that the wireless power transfer efficiency is also enhanced. Accordingly, when the battery status is low, the multi-tone PAPR information receiving unit 23 is appropriate to extend the energy transfer efficiency while maintaining a minimum transmission rate.

The adaptive power management and information decoding unit 24 consistently monitors the battery status, a received power, and a transmission rate QoS and controls the communication mode and the modulation index in accordance with an adaptive policy using this.

Specifically, during the dual mode simultaneous wireless power/information transmission, the receiver 20 may assign different priorities to data transmission and energy harvesting depending on a quantity of the battery. For example, when the battery quantity is sufficient, a higher priority is assigned to the data transmission rate than that of the energy harvesting and when the battery quantity is insufficient, a higher priority may be assigned to the energy harvesting. That is, IoT sensor nodes (receivers 20) may switch to the single tone communication mode or to the multi-tone communication mode in accordance with the battery status, the received signal power, and the transmission rate requirement (QoS: quality of service) and select the modulation index (M or Q). This will be described with reference to FIG. 5.

FIG. 3 is a table of constellations of a single tone communication mode of a dual mode simultaneous wireless power/information transmission method; and FIG. 4 is a view for comparing multi-tone energy conversion efficiency with respect to a single tone in accordance with received power, in the dual mode simultaneous wireless power/information transmission method.

Referring to FIG. 3, in the single tone communication mode, a transmission signal is modulated using a multi-level PSK modulation method and referring to FIG. 4, a high RF energy conversion efficiency is obtained by the non-linear characteristic of the rectifier at a high RF received power (0 dBm or higher).

In contrast, in the multi-tone communication mode, the PAPR modulation method is used and when the multi-tone is used, the RF energy conversion efficiency may be enhanced by the non-linear characteristic of the rectifier at a low RF received power (0 dBm or lower). By doing this, the power may be supplied to the received node in a broader area with the same transmission power. Further, information may be further loaded on PAPR using the fact that the PAPR of the signal varies depending on the number of subcarrier waves. Since the PAPR of the received signal is maintained almost regardless of the channel state (for example, a flat fading channel), there is an advantage in that the channel state information CSI is not necessary for information decoding. By doing this, it is possible to decode information using a less energy without separately estimating a channel.

Referring to FIG. 4, it is confirmed that the multi-tone communication mode exhibits a high RF energy conversion efficiency at 0 dBm or lower. That is, it is confirmed that a negative (−) power gain characteristic for an input power of 0 dBm to 30 dBm is shown and a positive (+) power gain characteristic for an input power of −10 dBm to −30 dBm is shown.

FIG. 5 is a view for explaining an adaptive power management and information decoding policy of a dual mode simultaneous wireless power/information transmission method.

Referring to FIG. 5, the adaptive power management and information decoding unit 24 controls the communication mode and the modulation index in accordance with the adaptive PM&ID policy while consistently monitoring the battery status, the received power, and the transmission rate QoS.

Specifically, in order to determine the communication mode, the battery quantity $B_1$ is compared with a reference value $B_{th}$ to check the battery status ($B_1 > B_{th}$). When the battery is sufficiently charged (Yes), a communication mode for satisfying the transmission rate QoS is determined, rather than charging of the battery. That is, when the battery quantity $B_1$ of the current IoT device is higher than the reference value $B_{th}$, a transmission rate QoS $R_{Qos}$ of a receiving end is compared with a reference value $R_{th}$. When the transmission rate QoS-$R_{Qos}$ of the receiving end is higher than the reference value $R_{th}$, the device operates in a single tone communication mode, and when the transmission rate Qos-$R_{Qos}$ of the receiving end is lower than the reference value $R_{th}$, the device operates in the multi-tone communication mode.

In contrast, when the battery is not sufficiently charged (No), the battery charging is high priority, rather than satisfying of the transmission rate QoS. That is, the communication mode for efficiently charging an energy is determined in connection with the RF received power $P_r$ (that is, $P_r$ and $P_{th}$ are compared so that when $P_r$ is higher than $P_{th}$, the device operates in a single tone communication mode and when $P_r$ is lower than $P_{th}$, the device operates in a multi-tone communication mode). When the selected communication mode is a single tone signal (mode single tone), the modulation index is determined to satisfy only the transmission rate QoS. In contrast, when the multi-tone signal is used (mode multi-tone), since there is a tradeoff relationship between the wireless power transfer efficiency and the transmission rate, the transmission rate is determined after determining the wireless power transfer efficiency.

FIGS. 6 to 11 are views for explaining an adaptive mode switching apparatus and method for simultaneous wireless power/information transmission operating in a dual mode according to an exemplary embodiment of the present disclosure. Hereinafter, specific description will be made with reference to FIGS. 6 to 11.

First, a basic operation of a transmitter/receiver according to the present disclosure and a transmission signal will be described.

According to the present disclosure, the transmitter/receiver appropriately adjust the single/multi-tone communication mode and modulation indexes M and Q in accordance with the control signal. For this operation, both the transmitter and the receiver include an adaptive mode switching control unit and one transmitter/receiver may transmit/receive a single/multi-tone mode signal. The transmitter selects a signal waveform to be transmitted in accordance with a feedback signal sent from a receiving node. When the single tone mode is selected, the signal is represented by Equation 1. Further, when the multi-tone mode is selected, N tones are selected from Q selectable tones and the signal is represented by Equation 2.

$$s_s(t) = Re\{A \exp(j2f_c t + j\theta)\} \quad \text{[Equation 1]}$$

Here, A and θ denote to an amplitude and a phase of a modulated signal and $f_c$ denotes a single tone frequency of the signal. In the receiver, the signal is simultaneously decoded through a coarse amplitude path and a fine amplitude path.

$$s_m(t) = Re\left\{\sum_{n=1}^{N} \sqrt{\frac{2P_T}{N}} \exp(j2f_n t + j\phi)\right\} \quad \text{[Equation 2]}$$

Here, $f_n$ is a frequency of each tone and ϕ is an initial phase aligned for maximum transmission PAPR. In order to enhance the wireless power transfer efficiency, precoding for maximal-ratio transmission is additionally performed so that an optimal transmission signal is represented by Equation 3.

$$s(t) = \begin{cases} A\dfrac{h^*}{|h|}\cos(2f_c t + \theta), & \text{for } s_s(t) \\ \sqrt{\dfrac{2P_T}{N}}\dfrac{h^*}{|h|}\sum_{n=1}^{N}\cos(2f_n t), & \text{for } s_m(t) \end{cases} \quad \text{[Equation 3]}$$

Here, h denotes a channel gain and h' denotes a complex conjugate of the channel gain.

Next, an operational characteristic and a configuration of a receiver which receives the transmission signal will be described in detail.

FIG. 6 is a schematic diagram of an adaptive mode switching apparatus for simultaneous wireless power/information transmission operating in a dual mode according to an exemplary embodiment of the present disclosure.

Referring to FIG. 6, an adaptive mode switching apparatus 100 for simultaneous wireless power/information transmission operating in a dual mode according to an exemplary embodiment of the present disclosure includes an energy harvesting unit 110, a single tone information receiving unit 120, a multi-tone information receiving unit 130, a time-division switch 150, and an adaptive mode switching control unit 140.

The energy harvesting unit 110 may harvest energy from a received signal which simultaneously transmits wireless power and information operating in a dual mode. The energy harvesting unit 110 receives the energy at a predetermined duty ratio of a time block regardless of the communication mode to perform self-powering. Specifically, when the single tone communication mode is used, a DC signal which passes through the rectifier is used to determine an energy level in a coarse amplitude path of the single tone information receiving unit.

When a magnitude of the received signal is larger than a threshold value, the single tone information receiving unit 120 detects amplitude information and energy information of the received signal to decode the received signal. Even though not illustrated in the drawing, the single tone information receiving unit 120 may be configured to include an envelope detector and an energy level detector. Specifically, the single tone information receiving unit 120 may obtain amplitude information of a signal using the envelope detector of the fine amplitude path. The amplitude information is decoded together with the energy information obtained through the energy level detector of the coarse amplitude path. Since the single tone signal is very sensitive to the channel, additional channel estimation is required for decoding. The single tone information receiving unit 120 requires more power than the multi-tone information receiving unit 130 and consumes more time to harvest the energy during the duty-cycling operation.

When the magnitude of the received signal is smaller than a threshold value, the multi-tone signal receiving unit 130 estimates a peak-to-average power ratio (PAPR) of the received signal to decode the received signal. Specifically, when the multi-tone signal receiving unit 130 utilizes the multi-tone PAPR decoding, the received information is mapped to a corresponding PAPR value. Even though not illustrated in the drawing, the multi-tone information receiving unit 130 may be configured to include an envelope detector and a PAPR estimator. Here, the envelope detector detects an envelope from the received signal and the PAPR estimator calculates the PAPR of the signal using the envelope and obtains a mapped information therefrom. The PAPR decoding method does not require the channel estimation in a frequency-flat (FF) channel and decodes the information only by simply calculating the PAPR value so that a less energy is consumed as compared with the communication method of the related art which calculates the phase information and the amplitude information. Further, the multi-tone is used so that the efficiency of wireless power transfer at a low input power is increased. When the multi-tone information receiving unit 130 is used, the self-powering is possible even for a short energy harvesting time in a duty-cycling operation.

The time-division switch 150 is disposed at a front end of the receiver to switch the received signal to one of the energy harvesting unit 110, the single tone information receiving unit 120, and the multi-tone information receiving unit 130. The time-division switch 150 is connected to an appropriate receiving unit in accordance with the duty cycling operation.

The adaptive mode switching control unit 140 determines a communication mode and a modulation index based on the battery status, a magnitude of the received signal, and a data transmission rate and controls the time-division switch 150 in accordance with the selected communication mode and modulation index. The adaptive mode switching control unit 140 controls the time-division switch 150 in accordance with the duty ratio and the modulation index to select one of the energy harvesting unit 110, the single tone information receiving unit 120, and the multi-tone information receiving unit 130.

The adaptive mode switching control unit 140 applies the first and second loop algorithms to determine a threshold value, a duty ratio which changes the respective periods of energy harvesting and information decoding, and a modulation index M or Q. Here, the first and second loop algorithms denote iterative inner/outer loop algorithms. The adaptive mode switching control unit 140 adjusts a mode switching threshold value $P_{th}$ for optimizing tradeoff between the transmission rate and the energy harvesting efficiency, switches a single/multi-tone mode in accordance with the threshold value, adjusts an information reception/energy harvesting duty cycle for self-powering, and selects a modulation index M or Q for an optimal transmission rate-energy harvesting efficiency in a given communication mode. The adaptive mode switching control unit 140 adaptively switches the communication mode as a surrounding environment changes and generates a control signal to obtain the optimal transmission rate-energy harvesting efficiency at all times.

The data transmission rate in each communication mode is represented by Equation 4.

$$R_v = \begin{cases} \dfrac{1}{D_v+1}(1-p_{out}(M))\log_2 M, & \text{for } s_s(t) \\ \dfrac{1}{D_v+1}\dfrac{1}{BT_m}(1-p_{out}(Q))\log_2 Q, & \text{for } s_m(t) \end{cases} \qquad \text{[Equation 4]}$$

Here, $s_s(t)$ denotes a single tone communication mode transmission signal, $s_m(t)$ denotes a multi-tone communication mode transmission signal, B denotes a bandwidth of a channel, and $D_v$ denotes a ratio of a time consumed for energy harvesting with respect to a time consumed to receive data in a duty cycling operation at the v-th time block (see FIG. 7). Further, an outage probability $P_{out}$ denotes a possibility that a Bit-Error Rate (BER) $p_b$ in a given M or Q does not satisfy a target BER condition ($p_{tag}$) so that reliable communication is not possible.

Further, the energy (power) $E_{EH}$ harvested in the v-th time block is represented by Equation 5.

$$E_{EH} = \dfrac{D_v}{D_v+1} T_v \times \hat{\Psi}_{EH}(P_R) \times P_R \qquad \text{[Equation 5]}$$

Here, $\hat{\Psi}_{EH}$ denotes a power conversion efficiency (PCE) function of a rectifier of an energy harvesting unit, $P_R$ denotes a magnitude of a received signal, and $T_v$ denotes a length of the v-th time block.

For the purpose of self-powering, the battery status needs to satisfy the self-powering condition as represented in Equation 6 in one time block.

$$E_{EH} \geq E_{C,i} \qquad \text{[Equation 6]}$$

$$D_v \geq \dfrac{P_{C,i}}{P_{EH}}$$

$E_{C,i}(P_{C,i})$, $i \in \{s,m\}$ denote an energy (power) consumption of circuit to decode single/multi-tone signal, respectively and $E_{EH}(P_{EH})$ denote an energy (power) harvested from the v-th time block in the duty-cycling operation respectively, by the receiver.

The adaptive mode switching control unit 140 may utilize Equation 6 to update an optimal mode switching threshold value $P_{th}$ for achieving a maximum data transmission rate while satisfying the self-powering condition as represented in Equation 7.

$$(P1): \max_{P_{th}} E_v[R_v] \qquad \text{[Equation 7]}$$

$$\text{s.t. } E_{EH} \geq E_{C,i}$$

$$p_b \leq p_{tag}$$

Here, $E_v[R_v]$ denotes an average transmission rate, $P_{th}$ denotes a threshold value for switching a communication mode, $E_{EH}$ denotes a harvested energy in the v-th time block, $E_{C,i}$ denotes an energy consumption of circuit, $P_b$ denotes a BER (Bit Error Rate) given the modulation index, and $P_{tag}$ denotes a target BER.

In order to determine the optimal mode switching threshold value $P_{th}$, the adaptive mode switching control unit 140 may separately perform P2 for selecting a single/multi-tone communication mode in a long-term scale and P3 for calculating a duty cycle between information decoding/energy harvesting in a short-term scale. That is, P1 may be optimized by repeatedly performing first and second loop algorithms in a mixed-time scale which proposes P2 and P3.

Hereinafter, a specific optimization process will be described with reference to FIGS. 7 to 11.

FIG. 7 is a view for explaining a time-division operation used for an adaptive mode switching apparatus for simultaneous wireless power/information transmission operating in a dual mode according to an exemplary embodiment of the present disclosure, FIG. 8 is a view for explaining an optimization cycle of a duty cycle/modulation index and an optimization cycle of a threshold value for simultaneous wireless power/information transmission operating in a dual mode according to an exemplary embodiment of the present disclosure, and FIG. 9 is a view for explaining iterative first/second loop algorithms of an adaptive mode switching control unit of an adaptive mode switching apparatus for simultaneous wireless power/information transmission operating in a dual mode according to an exemplary embodiment of the present disclosure.

Referring to FIG. 7, an adaptive mode switching apparatus for simultaneous wireless power/information transmission operating in a dual mode according to an exemplary embodiment of the present disclosure operates in a time block unit (duty cycle) and performs both the energy harvesting (EH) and information decoding (ID) in one block. That is, the energy harvesting is performed first in one section and then information decoding is performed in the remaining section to satisfy the self-powering condition.

Referring to FIGS. 8 and 9, in order to determine the optimal mode switching threshold value $P_{th}$, the adaptive mode switching control unit 140 may separately perform P2 for selecting a single/multi-tone communication mode in a long-term scale and P3 for calculating a duty ratio between information decoding/energy harvesting in a short-term scale. That is, P1 may be optimized by repeatedly performing the first and second loop algorithms in a mixed-time scale which proposes P2 and P3.

First, a long-term transmission rate optimization problem P2 in an outer loop is as represented in Equation 8.

$$(P2): \underset{P_{th}}{\mathrm{argmax}} E_v[R_v^*] \qquad \text{[Equation 8]}$$

Here, $R_v^*$ denotes an optimal transmission rate in the v-th time block which is calculated through the information sent from the inner loop. The mode switching threshold value is updated by utilizing an average received power $\bar{P}_S$ which is estimated for a predetermined window size W and the information (communication mode, D*, M*, and Q*) sent from the inner loop and a new threshold value and the received power are compared to select a communication mode. The selected communication mode is fed back to the transmitter and input to the inner loop, simultaneously.

In the inner loop, a set of M or Q which satisfies the BER condition is found using the mode selecting information transmitted from the outer loop, and a duty ratio $D_v$ is calculated from M and Q. Based on this, after calculating a duty ratio $D_v$ which yields a maximum data transmission rate, the corresponding M or Q inputs to the outer loop again. A short-term optimization problem P3 for calculating an optimal transmission rate in a communication mode given from the outer loop and the v-th time block is formulated as represented in Equation 9.

$$(P3): \underset{D_v}{\mathrm{argmax}} R_v \qquad \text{[Equation 9]}$$

$$\text{s.t. } D_v \geq \frac{P_{C,i}}{P_{EH}}$$

$$p_b \leq p_{tag}$$

Here, $D_v$ denotes a duty ratio, $R_v$ denotes a data transmission rate, $P_{C,i}$ denotes a power consumption of circuit, and $P_{EH}$ denotes a harvested power.

The adaptive mode switching control unit 140 may repeatedly perform the optimization of a duty ratio and a modulation index for a next received signal for every time block, using the optimized threshold value. When the optimization of the duty ratio and the modulation index for a time block corresponding to a predetermined window size is completed, the adaptive mode switching control unit 140 may update the threshold value again.

The first/second loop algorithms are repeatedly applied by this method to update an optimal mode switching threshold value $P_{th}$ and transmit a mode switching feedback signal to the transmitter.

FIG. 10 is a flowchart for explaining an adaptive mode switching method for simultaneous wireless power/information transmission operating in a dual mode according to an exemplary embodiment of the present disclosure and FIG. 11 is a view for explaining a mixed-time scale operation used for an adaptive mode switching apparatus for simultaneous wireless power/information transmission operating in a dual mode according to an exemplary embodiment of the present disclosure.

Referring to FIG. 10, an adaptive mode switching method for simultaneous wireless power/information transmission operating in a dual mode according to an exemplary embodiment of the present disclosure may be performed through the following first to fifth steps.

First, in a first step S1010, initial values for a window size, a threshold value of switching a communication mode, a duty ratio of each communication mode, and a modulation index may be set.

Next, in a second step S1020, it is determined whether a magnitude of a received signal is larger than the threshold value at every window size. In this case, the communication mode may be determined by comparing an arbitrary mode switching threshold value $P_{th}$ set in the first step S1010 and the magnitude $P_{R,v}$ of the received signal.

When the magnitude $P_{R,v}$ of the received signal is larger than the threshold value $P_{th}$ as a result of determination in the second step S1020, the communication mode is determined to be a single tone mode in step S1030 and when the magnitude $P_{R,v}$ of the received signal is smaller than the threshold value $P_{th}$, the communication mode is determined to be a multi-tone mode in step S1050.

When the communication mode is determined in the third step S1030 and S1050, a duty ratio and a modulation index of a communication mode determined in every time block may be optimized in steps S1040 and S1060. The fourth step may be optimized using the above Equation 9.

The number of time blocks is increased in step S1070 and the third step to fourth step S1030 to S1060 are repeatedly performed. However, when the number of time blocks is equal to the window size in step S1080, the threshold value is optimized to be updated using the optimized communication mode, the duty ratio, the modulation index, and a magnitude of an average received signal in steps S1090 to S1110. The fifth step may be optimized using the above Equation 8. After updatting the threshold value, the first to fifth steps may be repeatedly performed.

Referring to FIG. 11, in the adaptive mode switching for simultaneous wireless power/information transmission operating in a dual mode according to an exemplary embodiment of the present disclosure, the outer loop updates the mode switching threshold value for every window period (for example, W=3) in a long-term scale and the single/multi-tone mode is selected in accordance with the threshold value of the received power in every block thereon. Further, for the purpose of self-powering, in the inner loop, the duty ratio $D_v$ is updated for every block so that the duty ratio varies in each block ($D_1$, $D_2$, and $D_3$ in T1, T2, and T3 vary).

FIG. 12 is a view illustrating an adaptive mode switching system example for simultaneous wireless power/information transmission operating in a dual mode according to an exemplary embodiment of the present disclosure.

Referring to FIG. 12, an adaptive mode switching system example for simultaneous wireless power/information transmission operating in a dual mode according to an exemplary embodiment of the present disclosure may be configured to include an adaptive mode switching transmitter AP and at least one receiver A to E.

The receiver includes the energy harvesting unit, the single tone information receiving unit, the multi-tone information receiving unit, the time-division switch, and the adaptive mode switching control unit which determines a communication mode and a modulation index in accordance with a reception environment to control the time-division switch, which have been described above. The transmitter receives a mode switching feedback signal for a dual mode operation from the adaptive mode switching receiver to generate a transmission signal.

According to the present disclosure, each receiver may determine a different communication mode and a modulation index depending on the reception environment to control the received operation. It is confirmed that a receiver A operates with a large M for a high data rate in a near field, a receiver B switches a single tone into a multi-tone simultaneous wireless power/information transmission (SWIPT) at the boundary, a receiver C operates with a small Q in a multi-tone simultaneous wireless power/information transmission (SWIPT), a receiver D operates with a large Q in a long distance, and a receiver E performs wireless power transfer (WPT) for self-powering with a maximum Q.

The transmitter may transmit data to each receiver by one of a single tone communication method and a multi-tone communication method depending on the feedback signal of the receiver. The receiver may determine a communication mode and a modulation index by comparing a magnitude of the received signal with a threshold value and optimize the duty ratio and the threshold value.

It will be appreciated that various exemplary embodiments of the present disclosure have been described herein for purposes of illustration, and that various modifications, changes, and substitutions may be made by those skilled in the art without departing from the scope and spirit of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. An adaptive mode switching apparatus for simultaneous wireless power/information transmission operating in a dual mode, comprising:
    an energy harvesting unit which harvests an energy from a received signal which simultaneously transmits wireless power and information operating in a dual mode;
    a single tone information receiving unit which detects amplitude information and energy information of the received signal to decode the received signal when a magnitude of the received signal is larger than a threshold value;
    a multi-tone information receiving unit which estimates a peak-to-average power ratio (PAPR) of the received signal to decode the received signal when the magnitude of the received signal is smaller than the threshold value;
    a time divisional switch which switches the received signal to one of the energy harvesting unit, the single tone information receiving unit, and the multi-tone information receiving unit; and
    an adaptive mode switching control unit which determines a communication mode and a modulation index based on a battery status, the magnitude of the received signal, and a data transmission rate and controls the time-division switch in accordance with the selected communication mode and modulation index.

2. The adaptive mode switching apparatus according to claim 1, wherein the adaptive mode switching control unit determines the threshold value, a duty ratio for changing the respective periods of the energy harvesting and the information decoding, or the modulation index (M or Q) by applying first and second loop algorithms.

3. The adaptive mode switching apparatus according to claim 2, wherein the adaptive mode switching control unit controls the time-division switch in accordance with the duty ratio and the modulation index to select one of the energy harvesting unit, the single tone information receiving unit, and the multi-tone information receiving unit.

4. The adaptive mode switching apparatus according to claim 1, wherein the adaptive mode switching control unit updates the threshold value by the following Problem P1

$$(P1): \max_{P_{th}} E_v[R_v]$$

$$\text{s.t. } E_{EH} \geq E_{C,i}$$

$$p_b \leq p_{tag}$$

(Here, $E_v[R_v]$ denotes an average transmission rate, $P_{th}$ denotes a threshold value for switching a communication mode, $E_{EH}$ denotes a harvested energy in the v-th time block, $E_{C,i}$ denotes an energy consumption of circuit, $P_b$ denotes a BER (Bit Error Rate) given a modulation index, and $P_{tag}$ denotes a target BER.).

5. The adaptive mode switching apparatus according to claim 4, wherein the adaptive mode switching control unit determines the threshold value by optimizing the duty ratio by the following Problem P3 to optimize a transmission rate and then optimizing the threshold value using the optimized transmission rate by the following Problem P2

$$(P2): \underset{P_{th}}{\operatorname{argmax}} E_v[R_v^*]$$

$$(P3): \underset{D_v}{\operatorname{argmax}} R_v$$

$$\text{s.t. } D_v \geq \frac{P_{C,i}}{P_{EH}}$$

$$p_b \leq p_{tag}$$

(Here, $E_v[R_v^*]$ denotes an optimized average transmission rate, $D_v$ denotes a duty ratio, $R_v$ denotes a data transmission rate, $P_{C,i}$ denotes a power consumption of circuit, and $P_{EH}$ denotes a harvested power.).

6. The adaptive mode switching apparatus according to claim 5, wherein the adaptive mode switching control unit repeatedly optimizes the duty ratio and the modulation index for the next received signal for every time block, using the optimized threshold value.

7. The adaptive mode switching apparatus according to claim 6, wherein when optimization of the duty ratio and the modulation index is completed for the time block corresponding to a predetermined window size, the adaptive mode switching control unit updates the threshold value again.

8. The adaptive mode switching apparatus according to claim 1, wherein when the adaptive mode switching control unit is used at a receiver, the adaptive mode switching control unit transmits a mode switching feedback signal configured by a communication mode switching signal and the modulation index corresponding to the v-th time block for a dual mode operation to a transmitter.

9. The adaptive mode switching apparatus according to claim 8, wherein when a single tone mode is selected, the transmitter transmits a transmission signal represented by the following Equation and the receiver simultaneously decodes the signal through a coarse amplitude path and a fine amplitude path $$s_s(t)=Re\{A\ exp(j2f_ct+j\theta)\}$$

(Here, A denotes amplitude of a modulated signal, $\theta$ denotes a phase of the modulated signal and $f_c$ denotes a single tone frequency of the signal.).

10. The adaptive mode switching apparatus according to claim 8, wherein when a multi-tone mode is selected, the transmitter selects N tones from Q selectable tones as represented in the following Equation to transmit the transmission signal $$s_m(t) = Re\left\{\sum_{n=1}^{N} \sqrt{\frac{2P_T}{N}} \exp(j2f_nt + j\phi)\right\}$$

(Here, $f_n$ denotes a frequency of each tone and $\phi$ denotes an initial phase aligned for maximum transmission PAPR.).

11. A system for simultaneous wireless power/information transmission operating in a dual mode, comprising:
an adaptive mode switching apparatus for simultaneous wireless power/information transmission operating in a dual mode which includes an energy harvesting unit which harvests an energy from a received signal which simultaneously transmits wireless power and information operating in the dual mode; a single tone information receiving unit which detects amplitude information and energy information of the received signal to decode the received signal when a magnitude of the received signal is larger than a threshold value; a multi-tone information receiving unit which estimates a peak-to-average power ratio (PAPR) of the received signal to decode the received signal when the magnitude of the received signal is smaller than the threshold value; a time divisional switch which switches the received signal to one of the energy harvesting unit, the single tone information receiving unit, and the multi-tone information receiving unit; and an adaptive mode switching control unit which determines a communication mode and a modulation index based on a battery status, the magnitude of the received signal, and a data transmission rate and controls the time-division switch in accordance with the selected communication mode and modulation index; and
a transmitter which receives a mode switching feedback signal for a dual mode operation from an adaptive mode switching receiver to generate a transmission signal.

12. An adaptive mode switching method for simultaneous wireless power/information transmission operating in a dual mode, comprising:
a first step of setting initial values for a window size, a threshold value which switches a communication mode, a duty ratio of each communication mode, and a modulation index;
a second step of determining whether a magnitude of a received signal is larger than the threshold value over every window period;
a third step of determining a single tone mode as the communication mode when the magnitude of the received signal is larger than the threshold value and determining a multi-tone mode as the communication mode when the magnitude of the received signal is smaller than the threshold value;
a fourth step of optimizing the duty ratio and the modulation index of the selected communication mode for every time block when the communication mode is determined; and
a fifth step of increasing the number of time blocks, repeatedly performing the third step and the fourth step, and optimizing and updating the threshold value using the optimized communication mode, the duty ratio, the modulation index, and a magnitude of an average received signal when the number of time blocks is equal to the window size.

13. The adaptive mode switching method according to claim 12, wherein after updating the threshold value, the first to fifth steps are repeatedly performed.

14. The adaptive mode switching method according to claim 12, wherein in the fourth step, the duty cycle and the modulation index are optimized using a data transmission rate optimized by the following Problem P3

$$(P3): \operatorname*{argmax}_{D_v} R_v$$
$$s.t.\ D_v \geq \frac{P_{C,i}}{P_{EH}}$$
$$p_b \leq p_{tag}$$

(Here, $D_v$ denotes a duty ratio, $R_v$ denotes a data transmission rate, $P_{C,i}$ denotes a power consumption of circuit, and $P_{EH}$ denotes a harvested power.).

15. The adaptive mode switching method according to claim 14, wherein in the fifth step, the threshold value is updated to have an optimized average transmission rate by the following Problem P2

$$(P2): \operatorname*{argmax}_{P_{th}} E_v[R_v^*]$$

(Here, $E_v[R_v^*]$ is an optimized average transmission rate.).

* * * * *